UNITED STATES PATENT OFFICE.

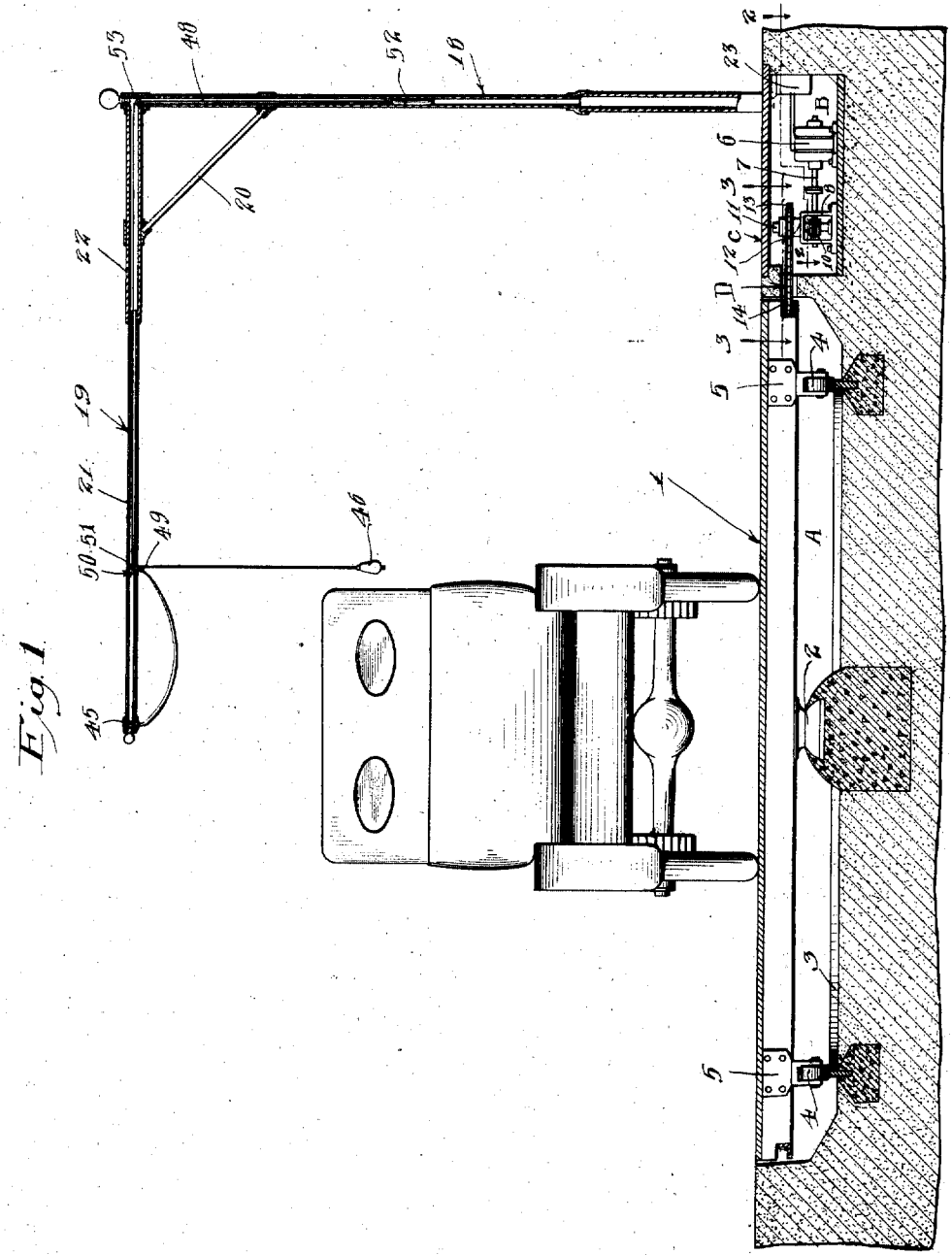

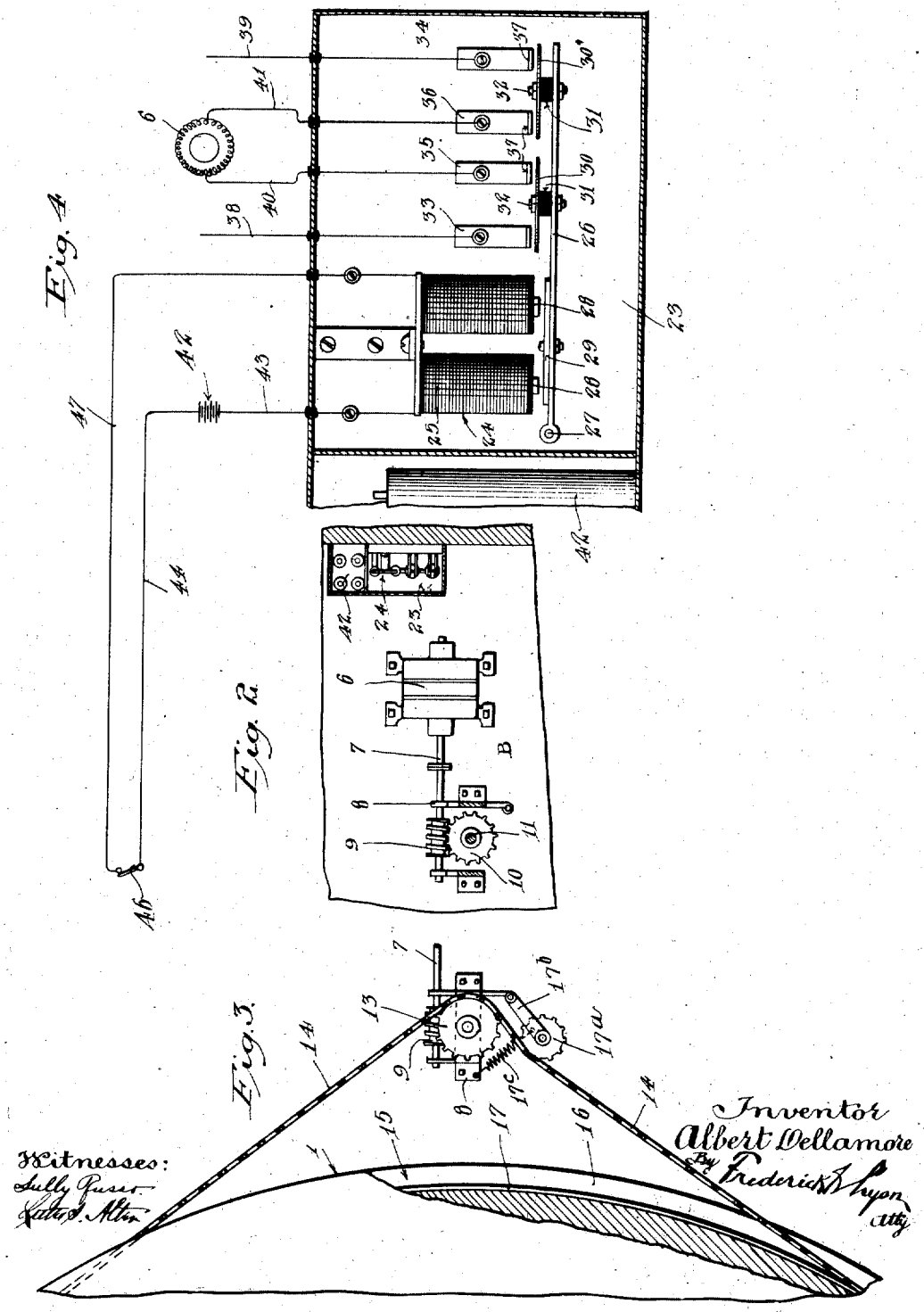

ALBERT DELLAMORE, OF LOS ANGELES, CALIFORNIA.

TURN-TABLE.

1,249,346.     Specification of Letters Patent.     Patented Dec. 11, 1917.

Application filed April 24, 1917. Serial No. 164,103.

*To all whom it may concern:*

Be it known that I, ALBERT DELLAMORE, a citizen of the United States, residing at Los Angeles, in the county of Los Angeles and State of California, have invented a new and useful Turn-Table, of which the following is a specification.

This invention relates to improvements in power-operated turn-tables for motor vehicles and resides in the provision of an inexpensive and reliable turn-table which may be conveniently operated from a motor vehicle when the latter is run upon the table.

An object of the invention is to provide a controlling means for the turn-table which may be readily operated from the driver's seat of a motor vehicle and which is inexpensive and reliable in operation.

Another object of the invention is to provide a simple and reliable form of drive means for rotating the turn-table.

The accompanying drawings illustrate the invention.

Figure 1 is a vertical sectional view of the turn-table showing a motor vehicle thereon.

Fig. 2 is a fragmentary sectional view taken on line 2—2 of Fig. 1.

Fig. 3 is a fragmentary sectional view taken on line 3—3 of Fig. 1; and

Fig. 4 is a diagram of the wiring for the motor and controlling means therefor.

In the drawings, 1 designates a circular turn-table which in this instance is made of reinforced concrete and is rotatably mounted on a central bearing 2 within a suitable pit A. A circular track 3 is mounted within the pit A and rollers or casters 4 mounted in bearings 5 which depend from the under side of the table rest and are adapted to run upon the said track.

A pit B houses the means for operating the table, has a suitable removable closure plate or lid C thereon, and communicates with a pit A through a passage D.

A motor 6, which in this instance is electric, is mounted within the pit B and has a drive shaft 7 which is journaled near its outer end in bearings 8. A worm 9 is fixed to the shaft 7 between the bearings and meshes with a worm gear 10 which is fixed to a vertical shaft 11. The shaft 11 is journaled in a bearing 12 and near its upper end carries a sprocket wheel 13. A sprocket chain 14 is rove around the sprocket 13 and extends through the passage D into the pit A around an angle iron ring 15 which is secured to the under side of the table 1 near the periphery thereof. The horizontal portion 16 of the ring 15 supports the chain 14 whereas the vertical portion 17 is frictionally engaged with the chain. An idler sprocket 17ª is journaled in a swingingly mounted bearing 17ᵇ and meshes with the chain 14 near the sprocket 13. A retractile spring 17ᶜ is secured to the bearings 17ᵇ and 8 and serves to hold the idler under tension against the chain to prevent the chain from "jumping" the sprocket 13. Upon rotation of the motor motion from shaft 7, through worm 9, worm gear 10, shaft 11, sprocket 13, chain 14 to ring 15 is transmitted the table. The friction drive arrangement prevents injury to motor or drive gears due to sudden starting of the table when a heavy vehicle is supported thereon. The certain amount of slippage thus provided for by the friction drive enables the table to gain momentum without possibility of injury to the drive mechanism.

The means for controlling the operation of the motor comprises a vertical standard 18 of preferably hollow construction located to one side of the table, near the pit B. From the upper end of the standard a hollow arm 19 extends outwardly over the table 1. The standard is of such height that the arm 19 will be supported with a considerable clearance relative to a vehicle when upon the turn-table. A brace rod 20 is secured at its ends to the standard and arm to give rigidity to the structure. The arm 19 is preferably telescopic and comprises two tubular sections 21 and 22.

Mounted within a suitable box or casing 23 within the pit B is a circuit closer 24 which comprises an electromagnet 25. An armature 26 is pivoted at one end as at 27 within the casing and below the magnet poles 28, an armature plate 29 being secured to the armature opposite the magnet poles 28. Carried on the armature 26 near the free end thereof are two circular contact disks 30 and 30' which are insulated from the armature as at 31 and are loosely secured to the armature by suitable means 32 so that they may rotate. Fixed within the casing above and normally spaced from the contact disks 29 are contact members 33, 34, 35 and 36, a pair being adapted to contact with each disk. The contact members are preferably L-shaped, the horizontal foot portions 37 thereof being adapted for engagement with the contact disks. Conductors 38 and 39 lead from a suitable source of current not shown to the contact members 33 and 34. Conductors 40 and 41 lead from the motor 6 to the contact members 35 and 36.

Extending from one side of a battery 42 to the magnet 25 is a conductor 43. From the other side of the battery which is preferably located within the casing, is a conductor 44 which runs up through the standard 18 and arm 19 out through an opening 45 in the end of the arm to a push button switch member 46. Another conductor 47 is connected with the magnet 25 and extends through the standard 18 and arm 19 out through the opening 45 to switch member 46. Thus when the switch member 46 is closed the circuit for the magnet is completed and when the magnet is energized the armature is drawn upwardly closing the circuit for the motor. The length of the conductors between the switch member 46 supported thereby and the outer end of the arm 19 is such that the operator of the vehicle on the turn-table may readily grasp the switch member and retain it during the turning of the table and vehicle thereon.

I provide a means to normally hold the push button switch member in up position so that considerable slack in the conductors which support it is had and the button is in position to be grasped by an occupant of the vehicle on the table 1. This means comprises a cord or cable 48 which is secured at one end as at 49 to the conductors 44 and 47 at a point midway of the ends of the portions of said conductors between the member 46 and the end of the arm 19. This cable 48 extends through an opening 50 over a pulley 51 in the arm 19 to the standard 18, down into the standard and its lower end carries a weight 52. A pulley 53 is mounted in the upper end of the standard 18 and supports the cable 48.

In operation, a vehicle is run upon the table and the operator without getting out of the vehicle may grasp the push button member 46 and operate it so as to close the circuit for the circuit closer 24. When the push button member 46 is operated current flows from battery 42, through wire 43, magnet 25, wire 47, push button 46 and back to the other side of the battery through conductor 48, thereby energizing magnet 25. The magnet 25 causes the armature 26 to be lifted upwardly so that the contact disks 30 and 30' will contact with the portions 37 of contact members 33, 34, 35 and 36. A circuit is then established as follows: Current flows through wire 38 from a suitable source, not shown, contact member 33, disk 30, contact member 35, wire 40 to motor 6, and from motor 6, through wire 41, contact member 36, disk 30', contact member 34, and from thence back to source of current through wire 39. When the motor circuit is closed motor 6 rotates shaft 7 which through worm 9, gear 10, shaft 11, sprocket 13 and chain 14 which rest upon angle iron ring 15, drives or rotates table 1. It will be seen that the operator retains the member 46 in his grasp during the operation of the table, thus the rotation of the table to any extent so as to bring the vehicle in the desired position, may be easily and readily effected. The slack in the conductors 44 and 47 permits the holding of the member 46 by the operator during the operation of the table and the weighted cable causes the slack to "pay out" gradually and the button member to return to normal out-of-the-way position when released by the operator.

I claim:

1. A turn-table for motor vehicles, a motor for operating the turn-table, driving connections between the motor and table, a vertical standard to one side of and extending well above the turn-table, an arm extending outwardly from the upper end of the standard over the turn-table, an electrical circuit for the motor being normally open, a circuit closer for closing the circuit, a means for operating the circuit closer, and a means for operating said circuit closer operating means carried by said arm and depending therefrom over the table.

2. In a turn-table for motor vehicles, a circular turn-table, a central bearing for the table, a circular track beneath the table, casters secured to the table and riding on the track, an angle iron ring secured to the under face of the table adjacent to the periphery thereof, a motor, a shaft driven by the motor, a worm on said shaft, another shaft, a worm gear on said last named shaft meshing with the worm, a sprocket wheel on said last named shaft, and a chain mounted upon the sprocket wheel and frictionally engaged with and resting upon the angle iron ring.

3. In a turn-table for motor vehicles, a circular turn-table, a motor for operating the turn-table, driving connections between the motor and table, a normally open electrical circuit for the motor, a circuit closer, electric magnetic means for operating the circuit closer, an electrical circuit for operating said means, a circuit closer for the last named electrical circuit located above the turn-table and in position to be held by the driver of the vehicle when on the table, and means to support said last named circuit closer.

4. In a turn-table for motor vehicles, a circular table, a motor for operating the table, a vertical standard located to one side of the table, a horizontal arm extending outwardly from the upper end of the standard, an operating member yieldingly supported from said arm in position to be grasped by the operator of a vehicle upon the turn-table, and means to restore the operating member to normal position.

5. A circular turn-table, a motor for operating the turn-table, an electric circuit for the motor, means to open and close said circuit, a circuit closer for said last named circuit, an upright standard, a horizontal arm extending from the standard over the turn-table, conductors forming a part of the last named circuit and depending from the outer end of said arm and connected with the last named circuit closer to support said circuit closer over the turn-table adjacent to a vehicle thereon, a flexible element connected with said conductors at a point between the circuit closer and free end of the arm, said flexible element extending through the arm and down into the standard, and a weight on the lower end of said flexible element.

6. In a turn-table for motor vehicles, a circular turn-table, a motor for operating the turn-table, an electrical circuit for the motor, stationary contact members in said circuit, an armature pivoted for movement toward and away from said contact members, contact disks carried on the armature and adapted to engage said contact members to close the circuit for the motor, electromagnets, and means to open and close said last named circuit operable from a point over the turn-table.

7. In a turn-table for motor vehicles, a circular turn-table, a central bearing for the table, a circular track beneath the table, casters secured to the table and riding on the track, an angle iron ring secured to the table adjacent to the periphery thereof, a motor, a sprocket wheel driven by the motor, and a chain mounted upon the sprocket wheel, frictionally engaging with the vertical portion of the angle iron ring and resting upon the horizontal portion of the angle iron ring.

8. A turn-table, a motor for operating the table, an electrical circuit for the motor, a circuit closer for said circuit, electromagnetic means for operating said closer, a circuit for said electromagnetic operating means, a circuit closer in the last named circuit, conductors connecting the last named circuit closer with the source of current for the last named circuit and magnetic operating means, an upstanding support to one side of the table and extending over the table, said conductors and the last named circuit closer depending from the support whereby it may be grasped by an occupant of a vehicle which is mounted upon the table.

9. A circular turn-table, an electric motor for operating the table, an electrical circuit for the motor, means to open and close the electrical circuit for the motor including a push button, a support, conductors connected with the push button and support and depending from the support, said push button being located over the table in a position to be grasped and operated by the occupant of a vehicle upon the table.

10. A turn-table, an electric motor, means for controlling the electric motor, a circuit closing means located over and above the table, a support for the circuit closing means, conductors secured to the circuit closing means and support, and means to permit said conductors to yield when the table is turning to permit the operator to retain the circuit closer during the rotation of the table acting to return the circuit closer to normal position when the circuit closer is released.

11. A circular turn-table, an electric motor for operating the table, means to open and close the electrical circuit for the motor including a switch member, a support, conductors connected with the support and swingingly supporting the switch member in position to be grasped by an occupant of a vehicle upon the table and held during the operation of the table.

Signed at Los Angeles, California, this 12th day of April, 1917.

ALBERT DELLAMORE.

Witnesses:
CHAS. J. CHUNN,
L. BELLE WEAVER.